United States Patent

Stoddard et al.

[11] 4,034,821
[45] July 12, 1977

[54] MOTORCYCLE CHAIN DRIVE

[76] Inventors: Richard B. Stoddard; Harold T. Stoddard, both of Rte. 1, Box 15, Orofino, Idaho 83544

[21] Appl. No.: 694,208

[22] Filed: June 9, 1976

[51] Int. Cl.² ........................................ B62M 9/02
[52] U.S. Cl. .......................... 180/32; 74/242.11 B; 280/284
[58] Field of Search ............ 180/32, 33 B, 30; 280/284; 74/242.11 B, 242.11 C, 242.15 B, 242.16, 226, 219

[56] References Cited

U.S. PATENT DOCUMENTS

| | | | |
|---|---|---|---|
| 667,594 | 2/1901 | Soucy, Jr. | 280/284 |
| 3,819,002 | 6/1974 | Heathwaite, et al. | 180/32 |
| 3,834,246 | 9/1974 | McGilp | 74/242.11 B |

FOREIGN PATENT DOCUMENTS

| | | | |
|---|---|---|---|
| 223,559 | 3/1925 | United Kingdom | 280/284 |

*Primary Examiner*—Philip Goodman
*Assistant Examiner*—Jack D. Rubenstein
*Attorney, Agent, or Firm*—Wells, St. John & Roberts

[57] ABSTRACT

An improvement in a chain drive mechanism wherein a drive sprocket is connected to a spaced driven sprocket by an endless chain with the driven sprocket being pivoted on a swing arm about an axis intermediate the two sprockets. The improvement includes idler members on opposite sides of the pivot axis for engaging and "pinching" the chain flights together at points equidistant from the pivot axis. Through this arrangement, pivotal movement of the driven sprocket about the axis is resisted, since leverage is applied through the idler members and all moments operating about the pivot axis are greatly reduced and applied in a direction opposite to the pivotal movement of the driven sprocket. There is therefore a tendency for the swing arm to seek an equalized condition.

9 Claims, 4 Drawing Figures

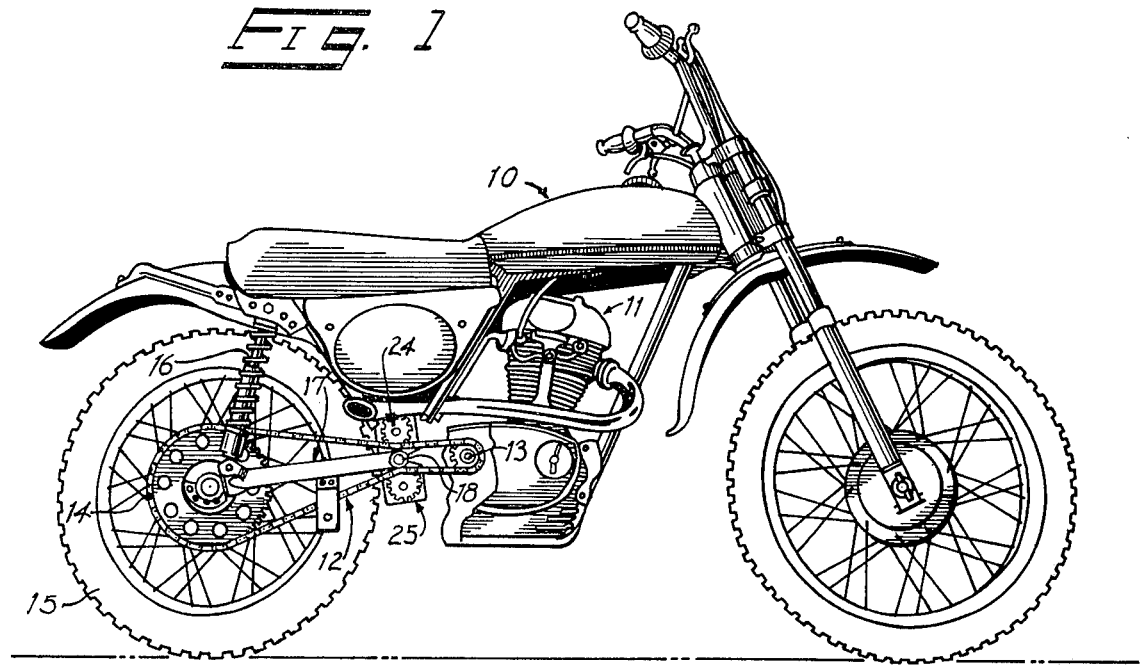
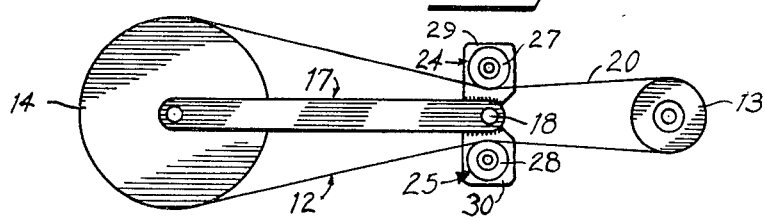
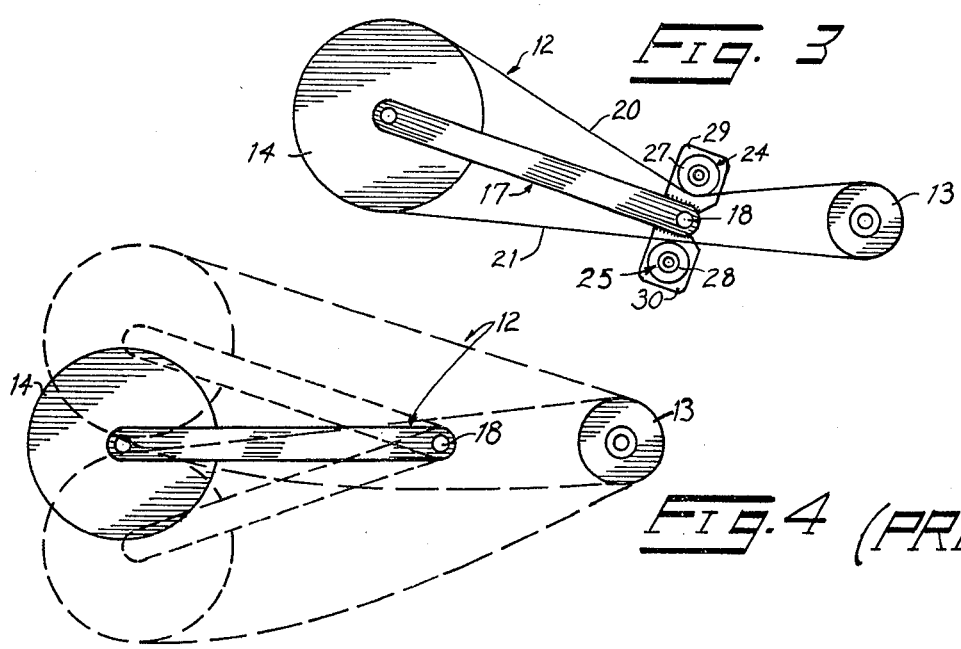

MOTORCYCLE CHAIN DRIVE

BACKGROUND OF THE INVENTION

Modern motorcycles generally have a rear suspension that includes a "swing arm" arrangement whereby the rear wheel is held for vertical travel about a pivot point located between the engine drive sprocket and the rear wheel impossible sprocket. Space requirements make it practically possible to pivot the swing arm at the axis of the drive sprocket. When the swing arm rotates about its pivot axis, the effective distance between the drive sprocket and driven sprocket shortens. This causes slack in the attached chain and varies the leverage moments on the swing arm due to abrupt change in chain tension on the tight side of the drive chain. The varying chain tension produced through the rotation of the swing arm due to horsepower transmitted to the rear wheel and shock loading due to chain slack, all act with varying moments upon the swing arm. This causes erratic action of the rear wheel suspension which is very undesirable for the rider. This situation occurs most frequently and is most noticeable during "moto-cross" racing wherein the motorcycle and rider are subjected to severe terrain at relatively high speeds. In such a situation it is of utmost importance that the rider be able to predict the behavior of the motorcycle suspension.

U.S. Pat. No. 1,143,793 granted to A. Strand on June 22, 1915 discloses a motorcycle with a chain drive arrangement that is a partial solution to the above mentioned problems. Strand utilizes two individual chains interconnecting four sprockets. The engine drive sprocket is connected by a first chain to a first idler sprocket. The first idler sprocket is keyed to a shaft that also includes a second idler sprocket. The two idler sprockets are fixed relative to one another but are free to rotate with the swing arm to which they are mounted. The second idler sprocket is interconnected with the driven sprocket by the second endless chain. Since the sprockets are centered on the pivot for the swing arm, no chain slack wll develop as the rear wheel moves vertically about the pivot axis. As the driven sprocket moves vertically about the pivot axis, the chain is taken up on one side of the driven sprocket while it is let out in an equal amount from the opposite side. There is no resistance to pivotal movement of the swing arm due to tension in the chain flights. Furthermore, since the two idler sprockets are spaced apart, the forces operating through the transversely spaced pair of chains operate against one another to produce a vertical torque that, if significant amounts of horsepower are applied through the sprockets, would be very difficult to effectively control. A French Pat., 1,150,961, discloses an arrangement that is very similar to the Strand drive mechanism for centering the pivot axis of the swing arm with that of the sprocket that transmits driving power to the driven wheel sprocket.

U.S. Pat. No. 3,819,002 was grated to H. Heathwaite et al on June 25, 1974 for a drive system. In this arrangement, a bell crank is utilized having the driven sprocket at one end and an idler sprocket at a remaining end. The bell crank is privoted to a motorcycle frame intermediate the axes for the drive and driven sprockets. The idler sprocket is situated for engaging the lower or "slack" flight of the endless chain and moves in response to pivotal movement of the bell crank about its pivot axis. The idler sprocket supposedly takes up slack produced along the lower flight as the bell crank pivots about its axis. The idler sprocket is arrranged to engage the endless chain on an inside surface thereof such that when the rear end of the bell crank is pivoted upwardly, the idler sprocket will pivot downwardly, taking up the slack that would normally be created between the drive and driven sprockets on the "slack" side. It does not appear from the patent disclosure that slack resulting from downward wheel movement would be removed by the idler sprocket.

A United Kingdom Pat. No. 223,559 granted Mar. 12, 1925, discloses a rear suspension for a bicycle. This device shows a swing arm arangement that is adapted to be pivotably mounted to the rear fork of a bicycle frame. The arm mounts the wheel and drive sprocket on one side of the pivot and is connected to springs that oppose pivotal movement of the arm. An idler, take-up sprocket is also mounted to the swing arm between the pivot and drive sprocket to take chain slack as the rear wheel pivots about the swings arm pivot axis. This "take-up" sprocket engages the upper driving flight of the chain and is engaged with the lower, downwardly facing surface thereof. Only the springs attached to the free end of the swing arm serve the function of maintaining the rear wheel in a desired position relative to the bicycle frame.

The present invention utilizes a pair of spaced idler sprockets located on opposite sides of the pivot for the swing arm. These sprockets each engage the adjacent chain flight on an outside surface thereof. The sprockets are mounted to the swing arm to "pinch" the flights together at equidistant points from the pivot. By providing two freely rotatable idlers, we are able to hold the chain at a constant required length for all positions of the driven sprocket and, since power is applied through the idler sprockets on the swing arm, all moments on the swing arm due to chain tension are greatly reduced and a counterbalancing moment is applied in a direction opposite to the pivotal direction of the swing arm about its axis. There is therefore a tendency for the swing arm to seek and maintain a neutral position with the moments equalized about the swing arm pivot.

SUMMARY OF THE INVENTION

An improvement is described for drive mechanisms in wheeled vehivles of the type that include a drive sprocket and a driven sprocket interconnected by an endless chain. The chain includes an upper flight that is above the sprocket axes and a lower idler return flight that is located below the sprocket axes. Swing arm means is included for supporting the driver sprocket for pivotal movement about a pivot axis located between the spaced drive sprocket and driven sprocket axes. The improvement is embodied in a first and second idler means for engaging the chain from above and below the respective flights. The first and second idler means are diametrically opposed to one another through The pivot axis. The first idler means is positioned to engage the endless chain along the drive flight and the second idler means is utilized to engage the endless chain along the idler return flight.

It is a primary object of the present invention to provide a chain flight confining device that is capable of maintaining low vertical leverage moments on a pivoted swing arm in response to chain tension.

Another object is to provide such a confining device that permits utilization of a single endless chain between a drive sprocket and driven sprocket and therefore will not produce vertical torque at or about the swing arm pivot.

Another important object is to provide such a device that is extremely simple in construction and therefore inexpensive to manufacture.

A yet further object is to provide such a confining device that positively holds the endless chain in engagement with the drive sprocket and driven sprocket regardless of the pivoted position of the driven sprocket.

These and still further objects and advantages will become apparent upon reading the following description which, taken with the accompanying drawings, disclose a preferred form of the present invention.

BRIEF DISCRIPTION OF THE DRAWINGS

FIG. 1 is a side elevational view of a motorcycle incorporating the present improvements;

FIG. 2 is a diagrammatic view of the present improvements;

FIG. 3 is a view similar to FIG. 2 only showing different operational positions of the elements therein; and FIG. 4 is a schematic view of the typical prior art arrangement without the provision of the present invention.

DETAILED DESCRIPTION OF A PREFERRED EMBODIMENT

A conventional motorcycle is illustrated in the accompanying drawings and is designated therein by the reference character 10. The motorcycle 10 includes a conventional engine 11. A chain 12 interconnects a drive sprocket 13 on the engine 11 with a driven sprocket 14 on a rear wheel 15. The engine drives the rear wheel through the chain and sprocket arrangement.

The rear wheel 15 is supported through a shock-spring assembly 16 and a swing arm 17 incorporationg the present improvements. The swing arm 17 is mounted to the general motorcycle framework at a pivot 18. This pivot 18 is located between the axis of drive sprocket 13 and driven sprocket 14. It is necessary to possition the pivot at this location to maintain a minimum width dimension of the framework. Various forms of shock-spring arrangements 16 are utilized with different models and brands of motorcycles. However, most utilize a pivoted swing arm as shown with a shock-spring arrangement 16 interconnecting the swing arm (at a point rearward of the swing arm pivot 18) and general motorcycle framework.

FIG. 4 shows a schematic representation of the swing arm and sprocket arrangement of a conventional motorcycle. It is obvious that since the swing arm is pivoted between the axis of the drive and driven sprockets, that required length of the chain will vary as the swing arm pivots about its axis. This point is demostrated graphically by dashed lines in FIG. 4. As the swing arm pivots about its axis, the distance between the two pivots sprockets decreases and therefore the chain becomes slack. As briefly stated above, it is a primary purpose of the present invention to prevent the formation of such slack and in addition, produce varying reaction moments in response to pivotal movememnt of the swing arm about its pivot axis in order to assist the functioning of the shock-spring assembly 16.

The present improvements are embodied in a first idler means 24 and a second idler means 25. First idler means 24 is utilized to engage the chain 12 from above the upper drive flight 20. Second idler means 25 is utilized to engage the chain 12 from below an outside lower surface of a lower return flight 21 of chain 12. The idler means 24 and 25 are utilized to "pinch" the chain at tangential points equidestant to the pivot 18 and on opposite sides thereof.

The idler means 24 and 25 are simply comprised of free wheeling sprockets 27 and 28 respectively. The sprockets are freely, rotatably mounted by respective brackets 29, 30 to swing arm 17. The brackets 29 and 30 may be an integral part of the swing arm assemly or may be otherwise fixed thereto for movement about the pivot 18. The sprocket axes are diametrically opposed through the pivot axis, and the points of engagement of the sprockets and chain flights are equidistant from the pivot axis.

It should be noted that it is not entirely necessary that idler means24 and 25 be of conventional chain sprocket configuration. It is entirely feasible that idler means 24 and 25 be roller assemblies or even modified conventional forms of chain tensioner slides or guides that are presently utilized in many different applications for the purpose of tensioning flights of chains between drive and driven sprockets.

It is also not essential that the idler means be mounted directly to the swing arm. It is conceivable that the idler means could be mounted to the general motorcycle framework and thus not pivot in response to pivotal movement of the swing arm. However, the distance between the means 24 and 25 would be maintained with respect to the axis of pivot 18 and the intended purpose of the present invention would still be realized to a more limited degree.

Operation of the present improvement may be seen with particular reference to FIGS. 2 and 3. During operation, the swing arm 17 will seek an equalized condition. However, a sudden external force having a substantially vertical directional component will cause the swing arm to pivot in an upward or downward direction about the axis of pivot 18. Assuming upward movement of swing arm 17 (FIG. 3) from its normal equalized position, the resulting slack in chain 20 is removed by increased peripheral wrapping of chain 20 about sprocket 27 and 14. This actually tensions the upper chain flight slightly, tending to push the swing arm 17 downwardly, The resulting downward moment against swing arm 17 assists the spring-shock assembly in returning the suspension to a normal condition relative to the general cycle framework.

If one assumed sprockets 13 and 14 to be fixed (unable to rotate in space) an upward thrust on the wheel or sprocket 14 would cause increased tension in chain flight 20 due to wrapping around sprockets 27 and 14. Likewise, a downward thrust causes similar wrapping of chain flight 21 around sprocket 28 and 14, and increased tension in chain flight 21.

It may therefore be understood that upward thrust causes increased tension in chain flight 20 and there is a downward moment against the swing arm 17 which would oppose the thrust causes increased tension in chain flight 21 and an upward moment is exerted against the swing arm, also opposing the thrust.

It follows also that if upward swing arm movement occurs there must be forward rotation of sprocket 14 and if downward movement occurs there must be backward rotation of 14. When the vehicle is in motion this translates to positive and negative acceleration, and it may therefore be understood that this assembly tends to resist sudden change and the normal action of the shock spring assembly is assisted.

In practical application, when engine power is applied and chain flight 20 is the tight side, the moments produced tend to return the swing arm to an equalized position somewhat below that shown in FIG. 2.

When return flight 21 is in tension, as during down hill conditions when engine compression is being used to retard the vehicle speed, moments are produced which tend to move swing arm 17 upward to a position somewhat above that shown in FIG. 2.

It may have become evident from the above description and attached drawing that various changes and modifications may be made therein. Therefore only the following claims are to be taken as restrictive definition of our invention.

What we claim is:

1. In a powered wheel vehicle having a drive mechanism including a drive sprocket, a driven sprocket, an endless chain directly interconnecting the drive and driven sprockets and a swing arm means pivotably mounting the driven sprocket to the vehicle for about a transverse pivot axis located between the drive sprocket and driven sprocket axes; an improvement comprising:
   first idler means above the pivot axis for engaging the endless chain from above its upper flight;
   second idler means below the pivot axis for engaging the endless chain from below its lower flight;
   wherein the first and second idler means are located so as to engage the chain flights at positions diametrically opposed to one aother through the pivot axis.

2. The combination set out by claim 1 wherein the first idler means is mounted to said swing arm means for pivotaL movement therewith.

3. The combination set out by claim 1 wherein the second idler means is mounted to said swing arm means for pivotal movement therewith.

4. The combination set out by claim 1 wherein the first and second idler means are comprised of free wheeling idler sprockets with rotational axes lying in a plane passing through the pivot axis of the swing arm means.

5. The combination set out by claim 2 wherein the second idler means is mounted to said swing arm means for pivotal movememt therewith.

6. The combination set out by claim 5 wherein first and second idler means are comprised of free wheeling idler sprockets with rotational axes lying in a plane passing through the pivot axis of the swing arm means.

7. The improvement set out by claim 1 wherein the first and second idler means tangentially engage chain at locations spaced equally from the pivot axis.

8. The improvement set out by claim 5 wherein the first and second idler means tangentially engage the chain at locations spaced equally from the pivot axis.

9. The combination set out by claim 8 wherein the first and second idler means are comprised of free wheeling idle sprockets with rotational axes lying in a plane passing through the pivot axis of the swing arm means.

* * * * *